United States Patent Office 3,047,130
Patented July 31, 1962

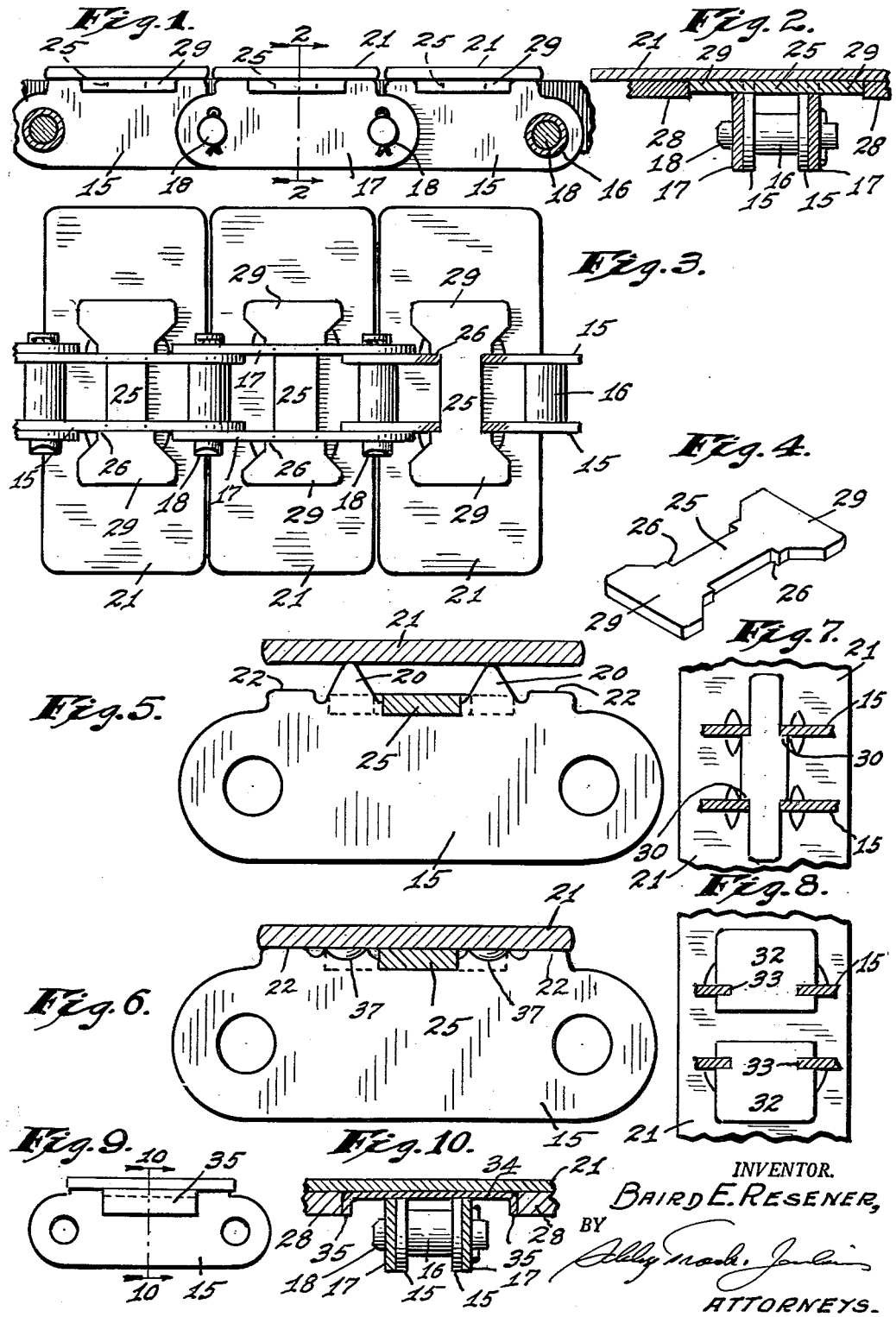

3,047,130
CONVEYOR CHAIN
Baird E. Resener, Indianapolis, Ind., assignor to Amsted Industries Incorporated, Chicago, Ill., a corporation of New Jersey
Filed Sept. 5, 1958, Ser. No. 759,331
8 Claims. (Cl. 198—189)

This invention relates to a conveyor chain comprising a series of pivotally interconnected links to each of which a conveyor platform is secured. Such chain has substantial advantages in the way of simple and economical construction; but, for some uses, is open to the objection that it lacks provision for satisfactory bearing contact with guide rails such as are sometimes used to prevent lateral deflection of the conveying stretch of the chain. It is therefore an object of this invention to provide a conveyor chain with means adapted to afford satisfactory bearing contact with guide rails. Another object of the invention is to provide guiding means in a form which can be assembled into the chain in a simple and economical manner.

A chain embodying this invention is characterized in that the links embody spaced link-plates formed along one edge with projections which are fused in the projection-welding of the conveyor platforms to the links. In embodying my invention in such a chain, I provide each side plate between its spaced welding projections with a notch which receives a guide plate. The depth of the notch is coordinated with the thickness of the guide plate in such a way that upon completion of the welding operation by which the conveyor platform is secured to each link such platform will cooperate with the base of the notch to prevent movement of the guide plate out of its own plane. The fit of the guide plates within the notches of the link plates locates the guide plates longitudinally of the chain, and each guide plate is provided with oppositely facing shoulders which, by engagement with the sides of the link plates, locates each guide plate transversely of the chain. In the manufacture of the chain, the links are conveniently assembled as in an ordinary form of power-transmission chain, the guide plates are positioned in the notches of the link plates, and the conveyor platforms are then projection-welded to the link plates with the result that the guide plates are locked in fixed positions relative to the respective links.

Other objects and features of the invention will become apparent from the following more detailed description and from the accompanying drawing, in which:

FIG. 1 is a side elevation, in partial section, of a conveyor chain;

FIG. 2 is a section on the line 2—2 of FIG. 1, showing the chain and its associated guide rails;

FIG. 3 is a plan view of the lower side of the chain shown in FIGS. 1 and 2, with parts of one link broken away;

FIG. 4 is an isometric view showing one of the guide plates used in the chain of FIGS. 1, 2, and 3;

FIG. 5 is a side elevation of a single chain-link, on an enlarged scale, showing the condition of the parts prior to the projection-welding operation;

FIG. 6 is a view similar to FIG. 5, but showing the link after completion of the projection-welding operation;

FIG. 7 is a plan view, in partial section, of the lower side of a chain-link embodying a modified form of guide plate;

FIG. 8 is a view similar to FIG. 7 showing a chain-link provided with two guide plates;

FIG. 9 is a side elevation of a single chain link embodying a still further modified form of guide plate; and FIG. 10 is a section on the line 10—10 of FIG. 9.

The chain shown in the drawing comprises a series of pivotally interconnected, alternating inner and outer links. Each inner link comprises a pair of spaced, parallel, inner link plates 15 extending between which are bushings 16 received with a press fit in holes adjacent the ends of the link plates. Each outer link comprises a pair of spaced, parallel, outer link plates 17 which overlap the ends of adjacent inner links and which receive pins 18 extending through the bushings of the inner links.

It has heretofore been proposed to produce a platform-type conveyor chain by welding the platforms to the chain links. In one method of welding the platforms to the links, each side plate 15 is provided along one edge with a pair of spaced welding projections 20; and after the chain has been assembled, a conveyor platform 21 is placed on the projections 20 of each link, as shown in FIG. 5, and is united with the link by a projection-welding operation which fuses the projections 20 and collapses them until the conveyor platform engages stop surfaces 22 on the side plates. In the practice of my invention, each side plate 15 or 17 is provided between its welding projections 20 with a notch adapted to receive a guide plate 25. The guide plate, which may take different forms as brought out more fully hereinafter, has a thickness such that when seated in the notches of the side plates its upper surfaces will be substantially coplanar with the stop surfaces 22 of the link plates. Accordingly, when the projection-welding operation is completes, as indicated in FIG. 6, the guide plate will be securely located in its own plane between the conveyor platform 21 and the bases of the notches in the link plates.

Each guide plate has provisions which, by engagement with link-plate-sides, locate the guide plate laterally of the chain. In the case of the guide plates 25 shown in FIGS. 1 through 6, such provisions take the form of inwardly facing shoulders 26 which engage the outer faces of the link plates of each chain link. It will be understood, of course, that the distance between opposed shoulders 26 will correspond with the width of the chain link and that in the particular chain illustrated the distance between the shoulders 26 associated with outer links will be greater than in the guide plates associated with inner links, as is clear from FIG. 3.

The guide plates 25 project laterally outwardly from the chain proper along the lower surfaces of the platforms 21 to be received between stationary guide rails 28 which support the platforms 21 over the conveying stretch of the chain. By engagement of their ends with the guide rails 28, the guide plates 25 prevent any appreciable lateral displacement of the chain. To increase the effective bearing area of the guide plates 25 with the guide rails 28, the guide plates may be formed with relatively wide heads 29.

In the guide plate shown in FIG. 7 the shoulders 30 which engage link plates to locate the guide plate laterally of the chain are outwardly facing and engage the inner faces of the link plates of the associated links.

In FIG. 8, I have illustrated a construction in which the single guide plate 25 or 29 associated with each link is replaced by a pair of guide plates 32. Each of the guide plates 32 has a width greater than the notches in the link plates and is notched at its sides, as indicated at 33, to receive the edges of the link-plate notches and thereby locate the guide plate transversely of the chain.

In FIGS. 9 and 10, I have shown guide plates 34 which may be located in any of the ways above described and which are provided at their ends with down-bent ears 35. Such ears engage the guide rails 28 and provide a bearing area greater than that provided by the unmodified ends of the guide plates shown in FIGS. 4, 7, and 8.

In the projection welding operation by which the platforms 21 are secured to the links, the fused metal of the projections 20 is displaced along the lower surface of each platform to form nubs 37. If, as is preferred, the welding projections 20 are located close to the sides of the guide plates, the spreading weld metal forming the nubs 37 will come into contact with the guide plates, and, without necessarily bonding to them, will in effect form keys positively locking the guide plates in fixed positions in their respective links. Thus any lost motion resulting from looseness of fit of the guide plates in the notches of the links will be eliminated in the finished chain.

It will be recognized from the above description that I have provided a conveyor chain guiding means which is extremely simple and which can be embodied in a chain without adding excessively to the cost of chain manufacture. This result is attained primarily because the operation of projection-welding the conveyor platforms in place automatically anchors the guide plates in the desired positions.

I claim as my invention:

1. In a conveyor chain having a plurality of pivotally interconnected links each comprising a pair of spaced link plates, corresponding side edges of the link plates being provided with notches, guide plates disposed in said notches and located thereby in fixed positions longitudinally of the chain, each of said guide plates having oppositely facing shoulders engaging at least one link plate beyond the limits of the notch therein to hold the plate in fixed position transversely of the chain, said guide plates projecting laterally outwardly from the chain for cooperation with a chain guiding means, and conveyor platforms respectively associated with said links, said platforms being secured to the respective links in positions overlying the guide plates to hold the latter in said notches.

2. The invention of claim 1 with the addition that each of said guide plates extends completely across and beyond the link plates, the shoulders of the guide plates facing inwardly and engaging the outer faces of the link plates.

3. The invention of claim 1 with the addition that each of said guide plates extends completely across and beyond the link plates, the shoulders of the guide plates facing outwardly and engaging the inner faces of the link plates.

4. The invention of claim 1 with the addition that there are two guide plates in each link, each of said guide plates having in its side edges notches the sides of which constitute shoulders engaging both the inner and outer faces of a single link plate.

5. The invention of claim 1 with the addition that said guide plates are provided outwardly from the chain with ears projecting perpendicularly from the guide plates and platforms.

6. In a conveyor chain, a series of pivotally interconnected links, a guide plate for each link, and a conveyor platform secured to each link and overlying the associated guide plate to cooperate with the link in confining the guide plate to its own plane, the guide plate and link having cooperating provisions locating the guide plate in fixed position in such plane, each of said guide plates including a first portion lying within the lateral limits of the link between the link and platform and a second portion projecting laterally outward from the chain link for cooperation with a guide rail.

7. A conveyor chain as set forth in claim 1 with the addition that each conveyor platform is welded to its associated link, each link embodying weld metal fused to the platform and constituting nubs engaging a guide plate and positively holding it in fixed position relative to the link and platform.

8. A conveyor chain as set forth in claim 6 with the addition that each conveyor platform is welded to its associated link, each link embodying weld metal fused to the platform and constituting nubs engaging a guide plate and positively holding it in fixed position relative to the link and platform.

References Cited in the file of this patent

UNITED STATES PATENTS

| | | |
|---|---|---|
| 1,020,056 | Rietzel | Mar. 12, 1912 |
| 1,651,981 | Tevander | Dec. 6, 1927 |
| 1,771,411 | Llewellyn et al. | July 29, 1930 |
| 1,872,394 | Bleicher | Aug. 16, 1932 |
| 2,277,871 | Mitchell et al. | Mar. 31, 1942 |
| 2,369,557 | Gettelman | Feb. 13, 1945 |